United States Patent
Cram et al.

(10) Patent No.: US 7,761,456 B1
(45) Date of Patent: Jul. 20, 2010

(54) SECURE RESTORATION OF DATA SELECTED BASED ON USER-SPECIFIED SEARCH CRITERIA

(75) Inventors: Paul Cram, San Luis Obispo, CA (US); Stephen Andrew Breidbach, Atascadero, CA (US); Robert James Somerville, San Luis Obispo, CA (US)

(73) Assignee: Symantec Operating Corporation, Mountain View, CA (US)

( * ) Notice: Subject to any disclaimer, the term of this patent is extended or adjusted under 35 U.S.C. 154(b) by 303 days.

(21) Appl. No.: 11/178,957

(22) Filed: Jul. 11, 2005

Related U.S. Application Data

(60) Provisional application No. 60/674,224, filed on Apr. 22, 2005.

(51) Int. Cl.
*G06F 7/00* (2006.01)
(52) U.S. Cl. .................... 707/754; 713/182; 711/162
(58) Field of Classification Search .................. 707/204
See application file for complete search history.

(56) References Cited

U.S. PATENT DOCUMENTS

| | | | | |
|---|---|---|---|---|
| 6,061,734 | A * | 5/2000 | London ....................... | 709/238 |
| 6,694,447 | B1 * | 2/2004 | Leach et al. .................. | 714/6 |
| 7,024,429 | B2 * | 4/2006 | Ngo et al. .................... | 707/201 |
| 7,146,387 | B1 * | 12/2006 | Russo et al. ................. | 707/204 |
| 2002/0083053 | A1 * | 6/2002 | Richard et al. ................ | 707/3 |
| 2002/0107877 | A1 * | 8/2002 | Whiting et al. ............. | 707/204 |
| 2002/0174139 | A1 * | 11/2002 | Midgley et al. ............. | 707/204 |
| 2004/0107199 | A1 * | 6/2004 | Dalrymple et al. .......... | 707/100 |
| 2006/0053178 | A1 * | 3/2006 | van Ingen et al. ........... | 707/204 |
| 2006/0149889 | A1 * | 7/2006 | Sikha .......................... | 711/100 |
| 2006/0190505 | A1 * | 8/2006 | DeMaio et al. ............. | 707/204 |
| 2007/0033237 | A1 * | 2/2007 | Prahlad et al. .............. | 707/204 |
| 2007/0078913 | A1 * | 4/2007 | Crescenti et al. ............ | 707/204 |

OTHER PUBLICATIONS

"Meeting Regulatory Compliance Requirements with VERITAS Enterprise Vault and Microsoft Windows Server Technologies", Rosen, Dell Power Solutions, Dell, Inc., May 2005.
"VERITAS Data Lifecycle Manager Actively Exploits Data from Cradel to Grave", Fisch, The Clipper Group Navigator™, The Clipper Group, Inc., Wellesley, MA, March 8, 2004.
"CommVault Organizes Data Management Sprawl", MacFarland, The Clipper Group Navigator™, The Clipper Group, Inc., Wellesley, MA, Dec. 17, 2004.

* cited by examiner

*Primary Examiner*—Neveen Abel Jalil
*Assistant Examiner*—Vei-Chung Liang
(74) *Attorney, Agent, or Firm*—Meyertons, Hood, Kivlin, Kowert & Goetzel, P.C.

(57) ABSTRACT

A method for secure restoration of data selected based on user-specified search criteria includes maintaining one or more backup versions of a plurality of storage objects and initiating the generation of a plurality of database entries, wherein each database entry corresponds to a backup version of a storage object and includes an encoding of a security descriptor associated with the storage object. The method may further include, in response to a backup version search request from a user, using contents of the search request and encodings of security descriptors stored in the plurality of database entries to identify one or more backup versions of a particular storage object that the user is authorized to access.

13 Claims, 10 Drawing Sheets

SECURE RESTORATION OF DATA SELECTED BASED ON USER-SPECIFIED SEARCH CRITERIA

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to backup and restoration of data within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of failures, such as system crashes, hardware storage device failures, software defects, and user errors such as inadvertent deletions of files, may potentially lead to data corruption or to a loss of critical data in such environments. In order to recover from such failures, various kinds of backup techniques may be employed. Traditionally, for example, backup images of critical data may have been created periodically (e.g., once a day) and stored on tape devices. However, a single backup version of production data may not be sufficient to meet the availability requirements of modern mission-critical applications. For example, for disaster recovery, it may be advisable to back up the data of a production application at a remote site, but in order to be able to quickly restore the data in the event of a system crash or other error unrelated to a large-scale disaster, it may be advisable to store a backup version near the production system. As a consequence, in some storage environments, multiple stages of backup devices may be employed. For example, a first backup version of a collection of production files may be maintained at a secondary host, and additional backup versions may be created periodically at tertiary storage from the secondary host. The additional backup versions, which may include snapshots of the primary storage objects, may also support the ability to restore primary storage objects as of specified points of time. For example, if a user inadvertently overwrites a particular document, and snapshots of the document are created once every day and retained for a week, it may be possible to retrieve a version of the document corresponding to any day of the previous week.

Traditionally, the ability to initiate restore operations has often been restricted to backup administrators or other backup experts who are familiar with details of backup storage organization, and end users have usually not been allowed to restore storage objects. Requiring administrators to support restore operations needed as a result of common errors (such as inadvertent deletions of user files) may lead to unnecessary delays and reduced productivity, especially where restorations may at least in principle be initiated by end users— e.g., where at least some backups are made to disk-based storage devices that do not require operators to load tapes for restore operations. However, end users may typically be unaware of, and uninterested in, the details of backup environments such as the physical locations where various versions of a file are stored. Furthermore, a particular end user may have authorization privileges to access only a small subset of backed up data. Techniques that efficiently allow end users to identify restorable versions of storage objects without compromising security, and without requiring the end users to understand details of backup implementations, may help reduce administrative costs and improve overall organizational efficiency.

SUMMARY

Various embodiments of methods and systems for secure restoration of data selected based on user-specified search criteria are disclosed. According to one embodiment, a method includes maintaining one or more backup versions of a plurality of storage objects (e.g., using replication, snapshot techniques, etc.) and initiating the generation of a plurality of database entries, wherein each database entry corresponds to a backup version of a storage object and includes an encoding of a security descriptor associated with the storage object. For example, the security descriptor may be a descriptor created and managed by an operating system, listing users and user groups granted access of various types (e.g., read or write access) to a storage object such as a file or a directory, and the encoding may be a compressed version of the operating system security descriptor. In some embodiments the one or more backup versions may be maintained by a backup manager, while the database entries may be created by a search engine at the request of the backup manager; in other embodiments, the backup manager may itself be configured to generate the database entries in addition to maintaining the backup versions. The method may further include receiving a backup version search request from a user, which may specify one or more search criteria in some embodiments. In response to the request, the method may include using contents of the search request (such as the search criteria) and encodings of security descriptors stored in the plurality of database entries to identify one or more backup versions of a particular storage object that the user is authorized to access. In one embodiment, a database entry may also include one or more fields indicative of the content of the corresponding backup version of the storage object (e.g., a field containing keywords), and the search request may include one or more content-based search criteria. By using the encoded versions of the security descriptors in performing a search, for example as described below, the efficiency with which search operations may be performed may be greatly improved.

In one embodiment, in response to the backup version search request, the method may include accessing a set of unique security descriptors associated with the plurality of storage objects. The unique security descriptors may include, for example, full versions of the encodings, which may also be stored within the database entries in addition to the encodings in some embodiments. The set of unique security descriptors may be dynamically extracted from the database entries in response to the search request in some implementations, and may be generated and/or maintained in advance in other embodiments. The method may further include identifying a subset of the unique descriptors that are compatible with the authorization privileges of the user requesting the search, generating a set of encodings corresponding to the subset, and using the set of encodings to specify a search criterion (e.g., in addition to the content-based search criteria specified by the user). For example, if unique security descriptors D1 and D2 are compatible with a user's authorization privileges, and the encoded versions of the security descriptors are E1 and E2 respectively, a query clause that may be represented as "((encoding=E1) or (encoding=E2))"

may be added to a search query. Since the encodings may typically be far smaller than the full descriptors in some embodiments (e.g., the encodings may be a few bytes long, while the full descriptors may be hundreds of bytes long), the amount of comparison-related processing in the query evaluation may be significantly reduced by using the encodings. However, in some embodiments, the technique (e.g., hashing or compression) used to derive the encodings from the full descriptors may result in "false positives" among the search results—e.g., two or more full security descriptors may map to the same encoding. In order to prevent false positives from compromising security (i.e., to ensure that the search results actually do represent backup versions that the user is authorized to access), in some embodiments the method may include verifying the user's privileges against the full or unencoded security encodings of the search result set.

The backup versions that match the search criteria and that the user is authorized to access may be displayed to the user (e.g., as icons in a graphical user interface) in one embodiment. For example, if a user's search request includes a search term, icons representing documents that contain the search term and are accessible to the user may be displayed in a window of a web-based search interface. The context of the search term within the document (e.g., the paragraphs or sentences in which the search term appeared) may also be displayed in some implementations. In response to a user request, one or more of the backup versions may be restored, e.g., to specified restoration destinations. Details of the locations of the various backup versions, as well as of the specific backup techniques used to create the backup versions, may be hidden from the users. For example, in one embodiment a first backup version of a set of files may be maintained using a replication technique, and a second backup version may include snapshots generated from the replica, but the users may not be aware that replication and/or snapshot generation techniques are being used, or where the replica and/or snapshots are stored.

Figure 1:
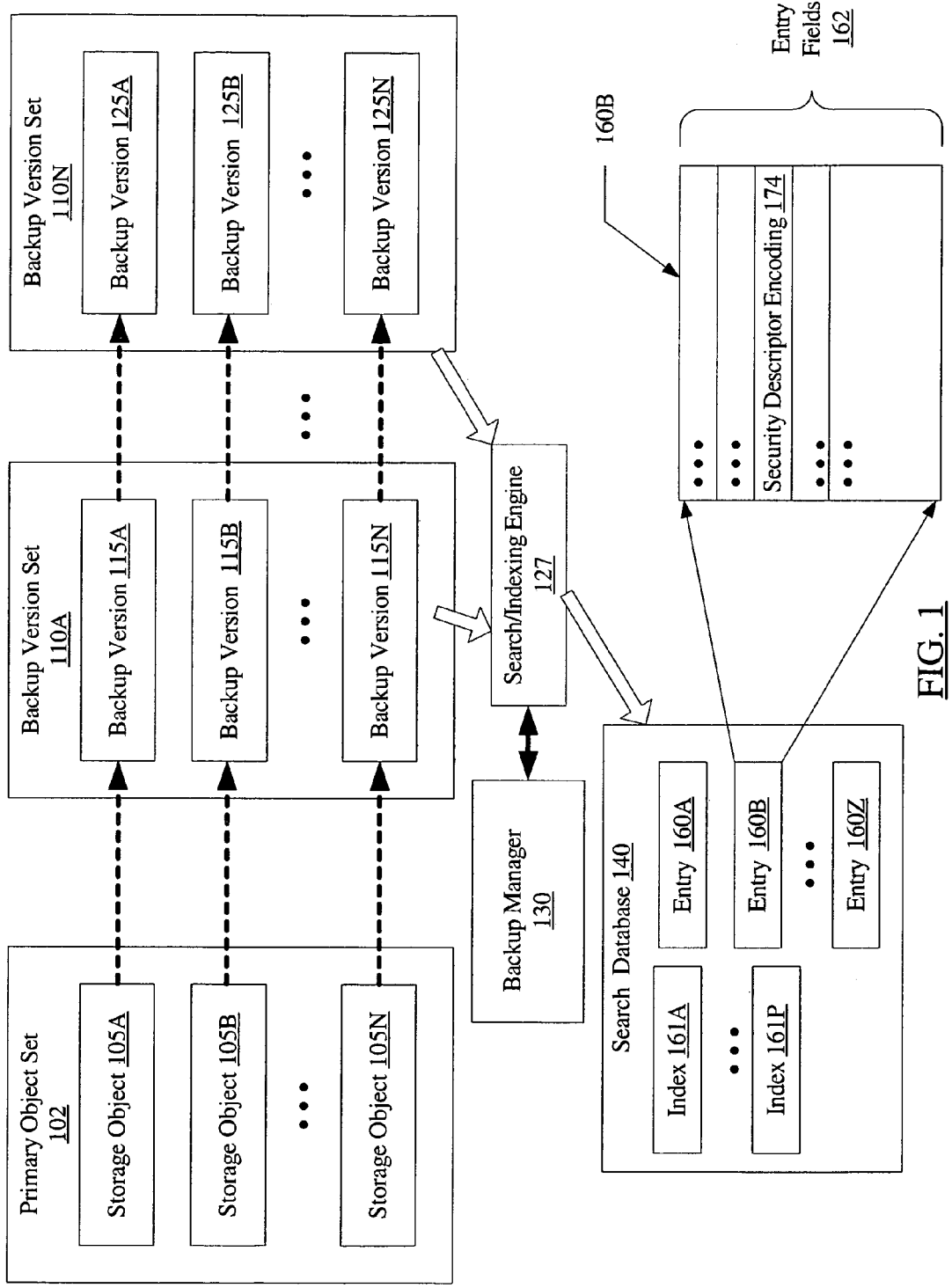
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system according to one embodiment. As shown, the system includes a primary object set 102 including a plurality of storage objects 105A, 105B, and 105N and a backup manager 130. Backup manager 130 may be configured to maintain one or more backup versions of storage objects 105A, 105B, and 105N, such as backup version sets 110A-110N. Primary object set 102 may be resident at one or more primary hosts, and backup version sets 110A-110N may be stored at secondary and/or tertiary servers in some embodiments. Each backup version set 110A-110N may include respective backup versions of storage objects 105A, 105B, or 105N. For example, backup version set 110A includes backup version 115A corresponding to storage object 105A, backup version 115B corresponding to storage object 105B, etc., and backup version set 110N includes backup version 125A corresponding to storage object 105A (and/or backup version 115A), backup version 125B corresponding to storage object 105B, etc. In some embodiments, backup versions within a backup particular backup version set 110A-110N may be derived directly from primary object set 102, while in other embodiments, at least some backup versions within at least one backup version set may be derived or generated from another backup version set.

Backup manager 130 may be configured to initiate a generation of a plurality of database entries 160 (e.g., 160A-160Z) included within a search database 140. References herein to database entries 160 may collectively refer to one or more of database entries 160, 160A, 160B, and 160Z. The database entries may be generated by search/indexing engine 127, which may be external to backup manager 130 in some embodiments as depicted in FIG. 1, and may be included within backup manager 130 in other embodiments. Each database entry 160 may correspond to a specific backup version of a storage object: for example, entry 160A may correspond to backup version 115A, entry 160B may correspond to entry 125A, etc. In some embodiments, database entries 160 may be generated for only a subset of the backup version sets 110A-110N—e.g., in one such embodiment, database entries may only be created for backup version set 110N. In some embodiments, indexes 161A-161P to the database entries 160 may also be generated and updated as needed. As shown, each database entry 160 may include a number of entry fields 162, including an encoding 174 of a security descriptor associated with the corresponding storage object 105A, 105B, or 105N, such as a security descriptor maintained by an operating system to identify the sets of users and user groups authorized to access and/or modify the storage object. The encoding may take substantially less storage than the full security descriptor—for example, depending on the complexity of the storage environment and user population for which backups are being performed, each operating system security descriptor may sometimes be a few hundred bytes long, while the encoding may be less than ten bytes long. A variety of techniques may be used to derive encoding 174 from the security descriptor in different embodiments; for example, in one embodiment, a hash function may be used, or a compression algorithm may be used, to generate a shortened representation of the security descriptor. As with many compression techniques, some data may be lost in generating the encoding; that is, the encoding may not accurately capture all the information that existed in the full security descriptor, and encodings of different security descriptors may sometimes not be unique. Techniques to compensate for such loss of information and/or non-uniqueness of encodings during searches based on the encodings are described below in further detail. A number of other fields may be included within a database entry 160, as described below in further detail in conjunction with the description of FIG. 2, such as information on the content of storage object 105A, 105B, and 105N (e.g., keywords for storage objects that are text documents), etc.

In some embodiments, the generation of backup version sets 110A-110N and the search database 140 may be asynchronous and/or independent of each other—for example, backup version set 110A may be generated via a periodic or continuous replication process, backup version set 110N may be generated via an independently-scheduled sequence of snapshot operations performed on backup version set 110A, and backup manager 130 may be configured to initiate generation of entries 160 asynchronously with respect to the backup processes used to generate the backup version sets.

In response to a backup version search request from a user, backup manager 130 may be configured to use contents of the search request (e.g., search terms included within the search request) and the encodings 174 to identify and/or display one or more backup versions of storage objects that the user is authorized to access. As described below in further detail, the use of encoded versions 174 of security descriptors may allow an efficient determination of the set of backup versions that match the user's search request and access permissions. The user may issue the backup version search request, for example, by specifying a search term related to the content of a storage object 105A, 105B, or 105N that has been inadvertently deleted or modified, and backup manager 130 may be configured to find one or more backup versions of the storage object from which the user may initiate a restoration of the storage object, e.g., using one or more search indexes 161A-161P. The user may be provided a search interface by backup manager 130 to issue the search request, and may be unaware of the existence and/or the physical locations of the backup version sets 110A-110N. The user may not even be aware of the location or directory path within primary object set 102 at which the storage object 105A, 105B, or 105N is stored, or even the complete name (e.g., including the file name extension in the case of a file) of the storage object. Using efficient search techniques in combination with security encodings 174 may allow backup manager 130 to provide support for secure user-initiated restore operations, without requiring the users to learn details of backup implementations. In some embodiments, a generic search interface to searches on-line storage objects as well as backup versions of storage objects may be used—that is, a common or seamless search interface may be provided for searching both primary and backed-up storage object sets.

A variety of different types of storage objects 105A, 105B, and 105N may be included within primary object set 102 in various embodiments. For example, storage objects 105A, 105B, and 105N may include user-created files, such as files created on individual user workstations using productivity applications such as word processors or spreadsheets, files stored on shared file systems or repositories (such as, for example, source code files or object code files in a software development environment), electronic mail messages or message aggregations such as user mailboxes, database tables or indexes associated with a database management system, simulation results, etc. Any of a number of different backup techniques may be used to create backup version sets 110A-110N in various embodiments. For example, a replication technique, such as asynchronous replication, synchronous replication, periodic replication or real-time replication may be used to generate backup version set 110A from primary object set 102 in one embodiment, while a snapshot or frozen image technique may be used to generate a backup version set 110B (not shown in FIG. 1) from backup version set 110A. The snapshot may include point-in-time copies or versions of various storage objects 105A, 105B, and 105N.

Figure 2:
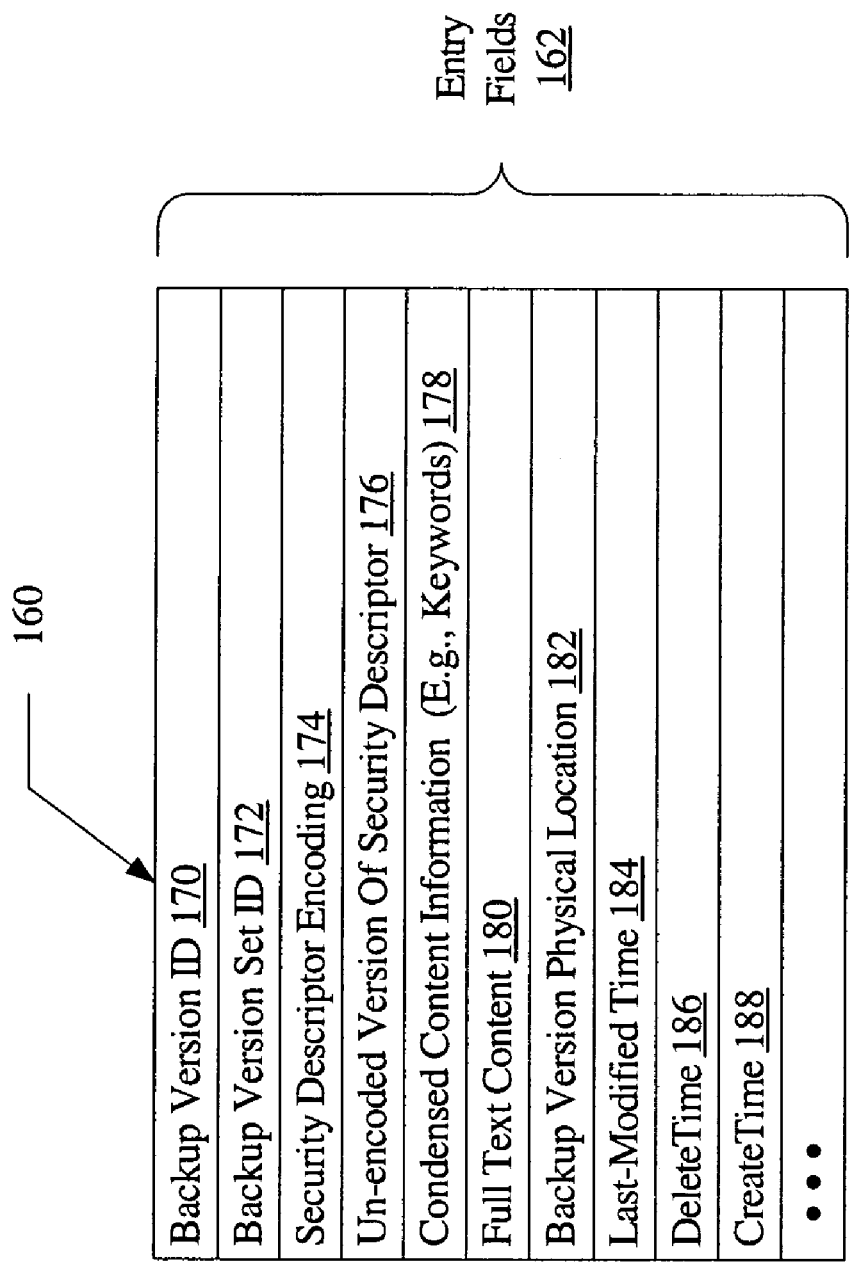
FIG. 2 is a block diagram illustrating exemplary constituent elements of a database entry, according to one embodiment.

FIG. 2 is a block diagram illustrating exemplary constituent elements of a database entry 160, according to one embodiment. As shown, the entry 160 may include a backup version ID 170 that identifies the specific backup version (e.g., a backup version 115A, 125B, etc.) of the storage object 105A, 105B, or 105N for which the entry was created, as well as a backup version set ID 172 identifying the corresponding backup version set 110A-110N. In addition to storing the encoded version 174 of the security descriptor, entry 160 may also include the un-encoded or full version of the security descriptor 176 in some embodiments. The full version of the security descriptor may be used to help eliminate false positive search results resulting from search queries based on the encodings 174, as described below in further detail in conjunction with the description of FIG. 5. In some implementations, full security descriptors may be stored once for a collection of storage objects, instead of being included in each database entry—for example, if all the files in a particular directory share a common security descriptor, the descriptor may be stored in one entry (or in a separate database object such as a table) and pointers to the descriptor may be stored in the database entries for the files. In addition, database entry 160 may also include a variety of content-related entries, such as condensed content information 178 and full text content 180 for text storage objects. Condensed content information may include, for example, keywords associated with the storage object, a short summary of the contents, or other metadata attributes such as creation or publication timestamps, size, validity period (e.g., for documents that are expected to be purged after a specified lifetime), project names associated with the storage objects, etc. For text storage objects, the raw text of the storage object (e.g., text extracted from the storage object after removing formatting and other metadata) may be stored within full text content field 180 in some embodiments. The raw text may be used to provide context for search results, as described below in further detail—e.g., when a user submits a search term as a search criterion for backup versions of storage objects, the sentence or paragraph in which the search term may be extracted from full text content field 180 and displayed along with pointers or identifications of the found backup versions.

The physical address (e.g., storage device identifier, offset within the storage device, length, etc.) of the backup version may also be included within entry 160 in the backup version physical location field 182. The physical address may be used to access the backup version for restoration, for example. A timestamp indicating when the storage object was last modified (i.e., prior to the creation of the entry 160) may be included within Last-Modified field 184. In some implementations, delete time field 186 and create time field 188 may be included within entry 160 to indicate when the corresponding backup version and/or primary storage object 105A, 105B, or 105N was deleted or created. Further details about the use of delete time field 186 in the context of snapshot deletion are provided below in conjunction with the description of FIG. 8.

Any of a variety of techniques may be used to implement search database 140 in different embodiments. For example, in one embodiment; relational database techniques may be used, while in other embodiments, object-oriented database techniques or a proprietary text-file based technique may be used. In some implementations, contents of some of the fields shown in FIG. 2 may be stored in separate entries or tables; e.g., the raw text may be stored separately from the database entry 160, and a pointer to the raw text entry may be stored within the entry 160 instead of including the entire text within the entry. Various additional fields (not shown in FIG. 2) may be included within database entry 160 in some embodiments—for example, in some embodiments, if a storage object includes a graphical element such as an illustration or photograph, a representation of the graphical element (or a description of the graphical element that may be used to respond to search requests) may also be stored within the entry 160, or file names, extensions and directory paths may be stored for storage objects that are files. One or more indexes 161A-161P may be maintained within search database 140 to help speed up queries directed at the entries 160—e.g., a particular index 161A may be generated for the condensed content fields 178 to facilitate keyword-based or attribute-based searches.

Figure 3:
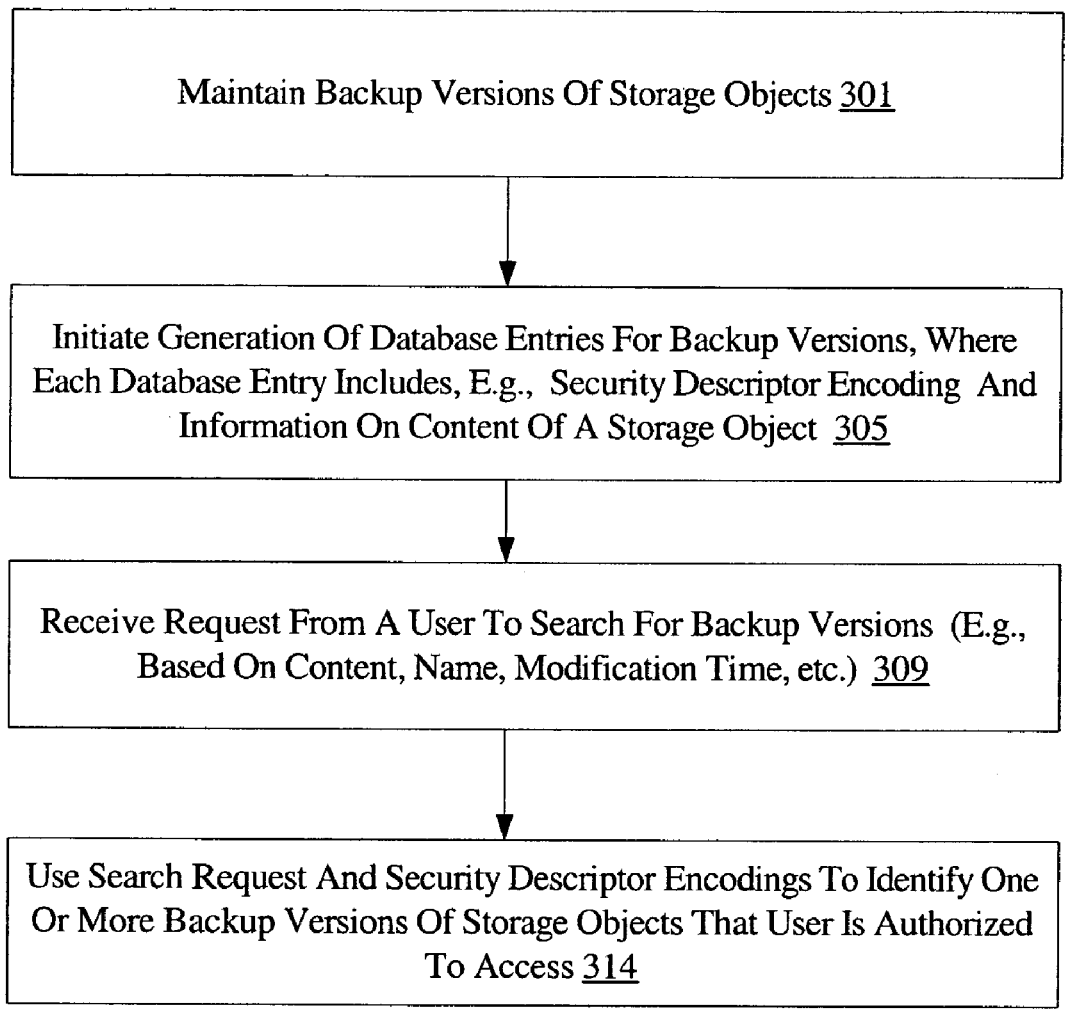
FIG. 3 is a flow diagram illustrating aspects of the operation of a backup manager, according to one embodiment.

FIG. 3 is a flow diagram illustrating aspects of the operation of backup manager 130 according to one embodiment. As shown in block 301 of FIG. 3, the backup manager may be configured to maintain one or more backup versions of storage objects, such as backup version sets 110A-110N corresponding to primary storage objects 105A, 105B, or 105N. Backup manager 130 may also be configured to initiate a generation of database entries 160 for the backup versions (block 305). In some implementations, the generation of the entries may be performed by an external search/indexing engine 127 (e.g., backup manager 130 may submit a database creation job to the engine 127, and the engine may proceed to create the database entries independently of other operations of backup manager 130), while in other implementations, the backup manager 130 may itself generate the entries. Each database entry 160 may include a variety of fields 162, as described above, including security descriptor encoding 174 and content-related fields. The encoding may be obtained by, in one embodiment, issuing a system call to obtain the operating system security descriptor for the corresponding primary storage object 105A, 105B, or 105N, and then performing a compression operation (e.g., via a hash function) on the operating system security descriptor. A user request to search for backup versions of storage objects 105A, 105B, or 105N may be received by backup manager (block 309), where the search request may include one or more search criteria, such as text search terms, storage object names, creation dates, etc. The authorization privileges and/or credentials of the user (e.g., user ID, group ID, etc.) may be explicitly included within the search request in some embodiments, and may be determined by backup manager 130 from the search context (e.g., if a user logs into a web interface or other search client to perform the search, the interface or client may retain user authorization information in session metadata) in other embodiments. In response to the request, the backup manager 130 may be configured to use the contents of the request (e.g., the search criteria) as well as the security descriptor encodings 174 to identify one or more backup versions that match the search criteria and are also accessible to the user based on the user's authorization privileges (block 314). Examples of the specific types of query terms or clauses that may be used by backup manager 130 to identify the backup versions in some embodiments are provided below. The search operation or operations to identify the backup versions that match the search criteria may be performed by an external search/indexing engine in some embodiments, and by the backup manager itself in other embodiments.

Figure 4:
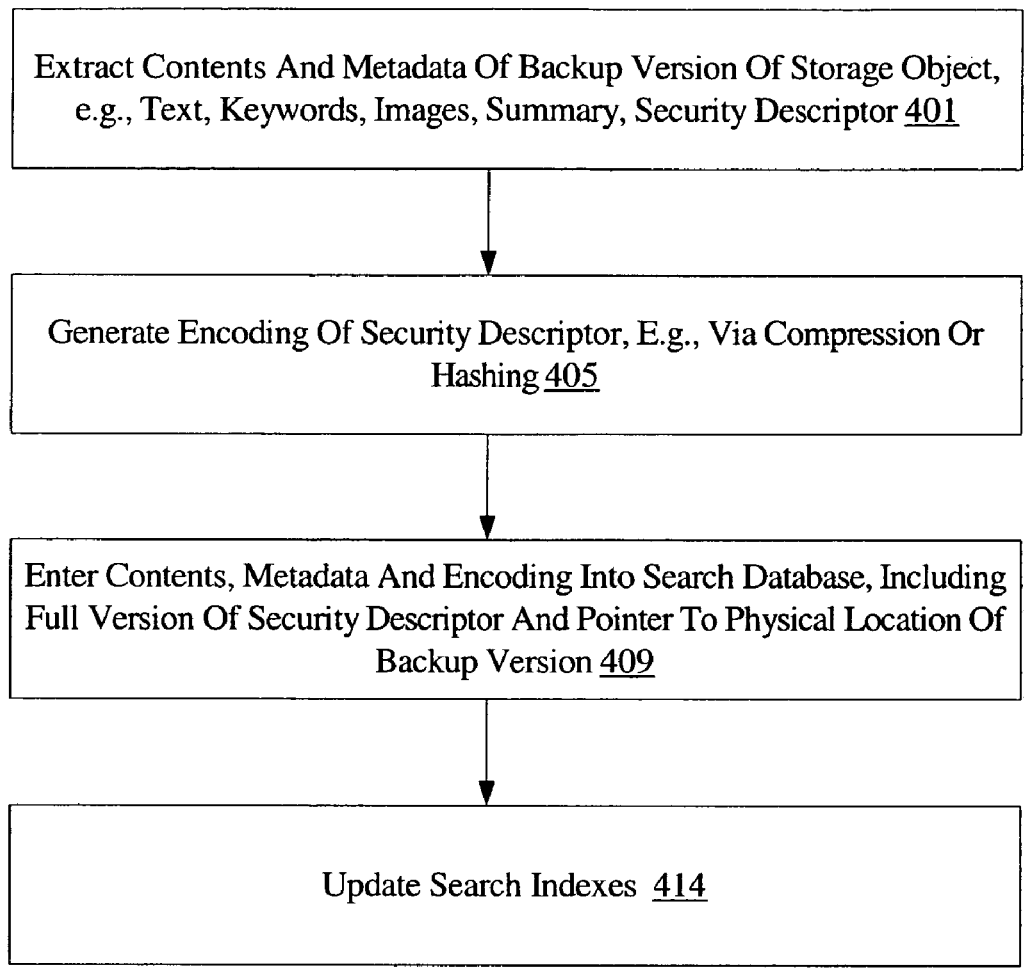
FIG. 4 is a flow diagram illustrating further aspects of the operation of a backup manager and/or a search/indexing engine during generation of database entries, according to one embodiment.

FIG. 4 is a flow diagram illustrating further aspects of the operation of backup manager 130 and/or search/indexing engine 127 during generation of database entries 160, according to one embodiment. In generating a search database entry 160, backup manager 130 and/or search engine 127 may be configured to extract contents and metadata of the backup version of a storage object for which an entry 160 is to be created (block 401 of FIG. 4). For example, some word processing applications include a variety of metadata (such as a summary, author name, keywords, etc.) within document files, and such metadata may be extracted or separated from the raw text for the purpose of database entry creation. In addition, security descriptor information for the storage object may also be obtained, e.g., from an operating system, an authorization engine, or the like. The encoding of the security descriptor may then be generated (block 405), e.g., using a hash function or some other compression technique. After allocating memory for the entry 160, fields 162 may be populated—e.g., content-related fields 178 and 180, the security descriptor encoding 174, the un-encoded or full version of the security descriptor 176, and backup version physical location 182, as well as various other field values, may be stored within the allocated memory (block 409). In some embodiments, the memory for the entry 160 may first be allocated only within volatile memory, and made persistent by writing the entry to non-volatile storage such as disk storage after it has been populated. After the entry has been populated, in some embodiments, one or more indexes 161A-161P may be updated to reflect the contents of the new entry (block 414). The indexes may be automatically updated by database management software in some implementations, e.g., if a conventional relational database is used for search database 140, and may have to be updated explicitly in other implementations. In some embodiments, separate indexes 161A-161P may not be used—e.g., the database entries 160 may themselves be organized as a searchable index structure or file.

Figure 5:
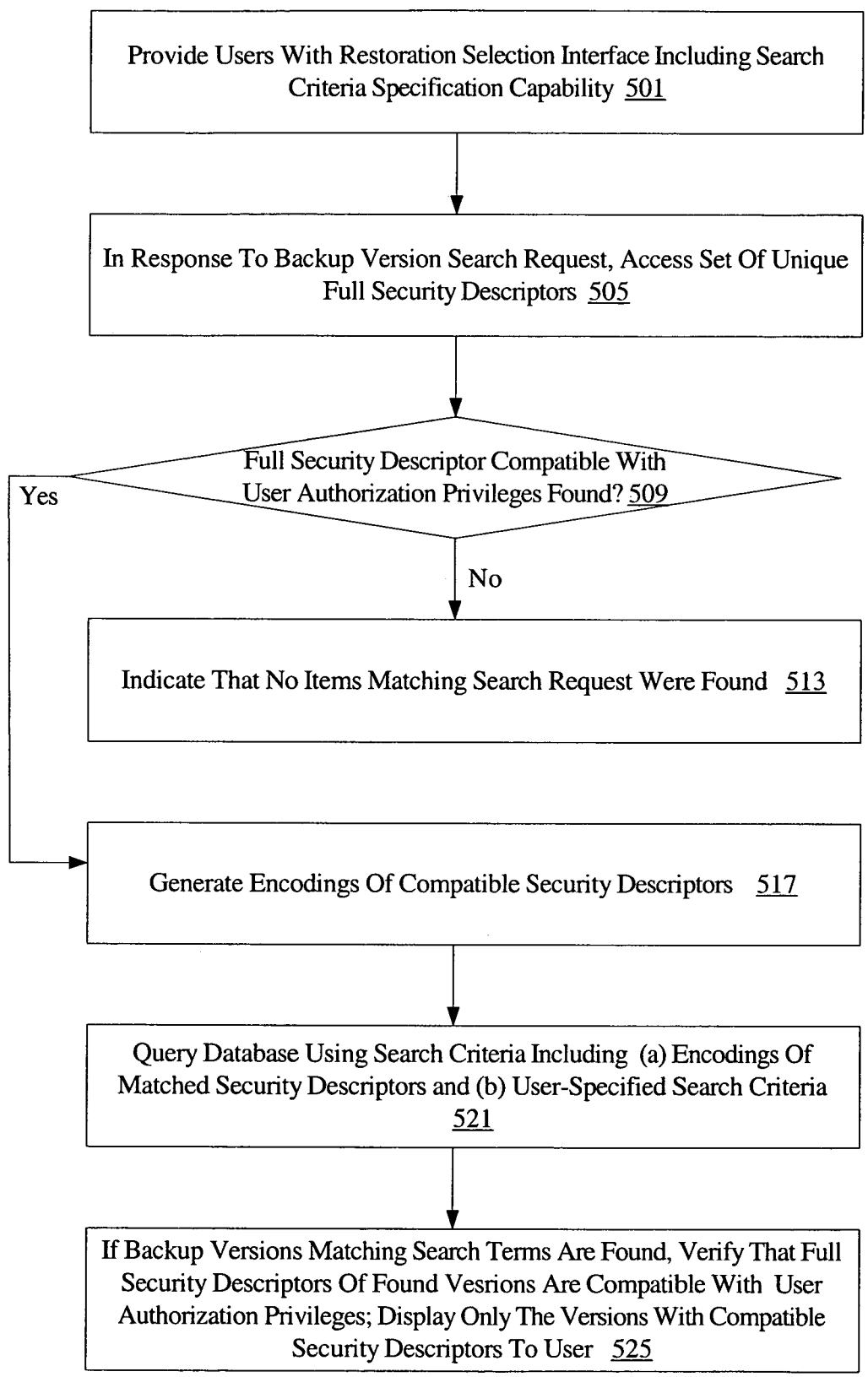
FIG. 5 is a flow diagram illustrating further aspects of the operations of a backup manager during restoration operations, according to one embodiment.

FIG. 5 is a flow diagram illustrating further aspects of the operations of backup manager 130 during restoration operations, according to one embodiment. Backup manager 130 may be configured to provide users with a restoration selection interface including search capabilities (block 501 of FIG. 5), as described in further detail below in conjunction with the description of FIG. 6. A variety of search criteria for backup versions may be specified using the interface in some embodiments, such as searches based on text search terms, images, date ranges, object names, object type names, etc. The same interface to select specific backup versions from which restore operations are to be initiated may be provided to end-users and administrators in some embodiments, while in other embodiments, a different interface or set of interfaces may be available to administrators than the interface available to users. For example, the administrator-specific interface may allow a specification of search criteria that may not typically be useful for end users, such as criteria that specify physical locations of backup versions, backup policy details, etc. End users may not be expected to know physical locations of backup versions (in fact, in some environments the locations of the backups may be deliberately hidden from end-users, e.g., for security reasons), so end-user interfaces may not be configured to allow specifications of physical locations in some implementations. In one embodiment, a restoration selection interface may be combined with, or incorporated within, a more general search interface. When a user submits a search request in such an embodiment, the search results may include online or current versions as well as backup versions of storage objects. The storage objects and backup versions that are searched for may be distributed across a variety of different types of storage media in some embodiments—e.g., current or on-line objects may be stored on fast local disks storage, backup versions on various types of disk arrays or tape devices, etc. The user may be allowed to restore a backup version, e.g., by overwriting the current version or to restoration target other than the current version.

In response to the backup version search request, backup manager 130 may be configured to enumerate a list of unique full (un-encoded) security descriptors associated with the storage objects for which entries exist in the search database (block 505). In some embodiments, the list of unique security descriptors may be extracted after the search request is received, e.g., by executing a query to retrieve the contents of un-encoded security descriptor fields 176 from all the entries 160, and by eliminating duplicate security descriptors from the query results. In other embodiments, backup manager 130 may be configured to maintain the list of unique security descriptors as a separate entity or table. For example, in one implementation, an empty list of unique security descriptors may be initialized prior to inserting any entries 160 into search database 140. When an entry for a new backup version is entered into search database 140, backup manager 130 may be configured to check whether the full security descriptor for the corresponding storage object 105A, 105B, or 105N is in the list of unique security descriptors, and to insert the full security descriptor into the list if it is not already present in the list. Even in large storage environments with thousands of users, the total number of unique security descriptors in use may often not be very large, thus allowing the set of unique security descriptors to be extracted or maintained without excessive overhead.

After the list of unique full security descriptors has been obtained, backup manager 130 may be configured to check whether any of the full security descriptors are compatible with the authorization privileges of the user that requested the search (block 509). The authorization privileges or credentials of the user may be included within the request as generated from the interface in some embodiments—e.g., the interface may require the user to log in, and the information supplied by the user to log in may be used to identify the privileges of the user. For example, in one implementation where the security descriptors include user names and group names, with specific sets of access permissions associated with each user or group, backup manager 130 may be configured to check whether the user name of the user, or the name of a group to which the user belongs, is included within any of the security descriptors. If any such descriptors are found, backup manager 130 may also be configured to verify that the specific access permissions granted to the user are compatible with restore functions—e.g., whether the user has read/write permissions that may be needed to view and/or restore the storage object associated with the security descriptor. In other implementations, capability-based or role-based security may be employed, where each user is granted one or more capabilities or roles, and backup manager 130 may be configured to determine whether any of the full security descriptors correspond to the roles/capabilities granted to the user.

If the analysis of the list of unique descriptors does not yield any compatible security descriptors, the backup manager may be configured to indicate to the user that no backup versions were found that matched the search criteria (block 513). The backup manager may thus be configured to terminate some searches based on user authorization privileges alone, without taking other search criteria into account. As a result, unauthorized or malicious users may not be able to affect the operations of backup manager 130 by issuing repeated requests for backup versions (e.g., in so called "denial-of-service" attacks) in some embodiments. If the analysis of the list of unique descriptors does yield some compatible descriptors, backup manager 130 may be configured to generate encodings of the compatible descriptors (block 517) using the same encoding technique that was used to generate security descriptor encodings 174.

Backup manager 130 may then be configured to use the encodings of the compatible descriptors in formulating and executing a search query. For example, if a set of compatible descriptors (D1, D2, D3) was found in operations corresponding to block 509 of FIG. 5, and the encodings corresponding to the descriptors were (E1, E2, E3) (e.g., if the encoded version of D1 was E1, the encoded version of D2 was E2, and the encoded version of D3 was E3), a query clause similar to the following may be generated by backup manager 130 in one embodiment: "(encoding=E1) OR (encoding=E2) OR (encoding=E3)". The term "OR" in the query clause indicates a logical OR operation, and the "=" operator may be interpreted, e.g., as a string equality operator, a full or partial string match operator in various implementations. The query clause may be combined with other clauses based on the search criteria submitted in the search request, as indicated in block 521 of FIG. 5. For example, if the user requested a search for backup versions of objects related to "Olympics" in the above example, the following combination of query clauses could be used: "(Keyword='Olympics') AND ((encoding=E1) OR (encoding=E2) OR (encoding=E3)). (The term "AND" in the query clause indicates a logical AND operation). It is noted that in many environments, the set of compatible descriptors found may be quite small, and the use of query clauses such as the above OR clause may help to reduce the search result set size without substantially increasing query complexity. By using encoded versions of the security descriptors in the query rather than the full versions, the comparison operations performed to obtain the query results may be made more efficient.

One or more backup versions, such as backup versions 115A-115N or 125A-125N may be found as a result of the query execution. However, because encodings of security descriptors may not be unique (e.g., two different full descriptors may happen to be encoded to the same encoded string or hash value) in some embodiments, the query result may sometimes include false positives, i.e., backup versions to which the requesting user does not have access. Consequently, in some such embodiments backup manager 130 may also be configured to retrieve the full security descriptors for the storage objects 105A, 105B, and 105N identified in the search results, and to verify that the full security descriptors are compatible with the user's authorization privileges (block 525). Only those backup versions whose full security descriptors are compatible with the user's privileges may be displayed to the user. The full security descriptors may be retrieved from the database entries 160 corresponding to the query result set for the verification. In some embodiments, where for example an operating system provides a system call interface that may be used to check whether a particular user is included a set of users and/or groups identified in a security descriptor, such a system call interface may be invoked for the verification. In one embodiment, if a current or on-line version of one or more of the storage objects corresponding to the result set backup versions exists, the most current security descriptors for that on-line version may be obtained directly from an operating system or authorization engine, and the backup versions may be displayed to the user only if the user is authorized to restore (e.g., by overwriting) the on-line version.

Figure 6:
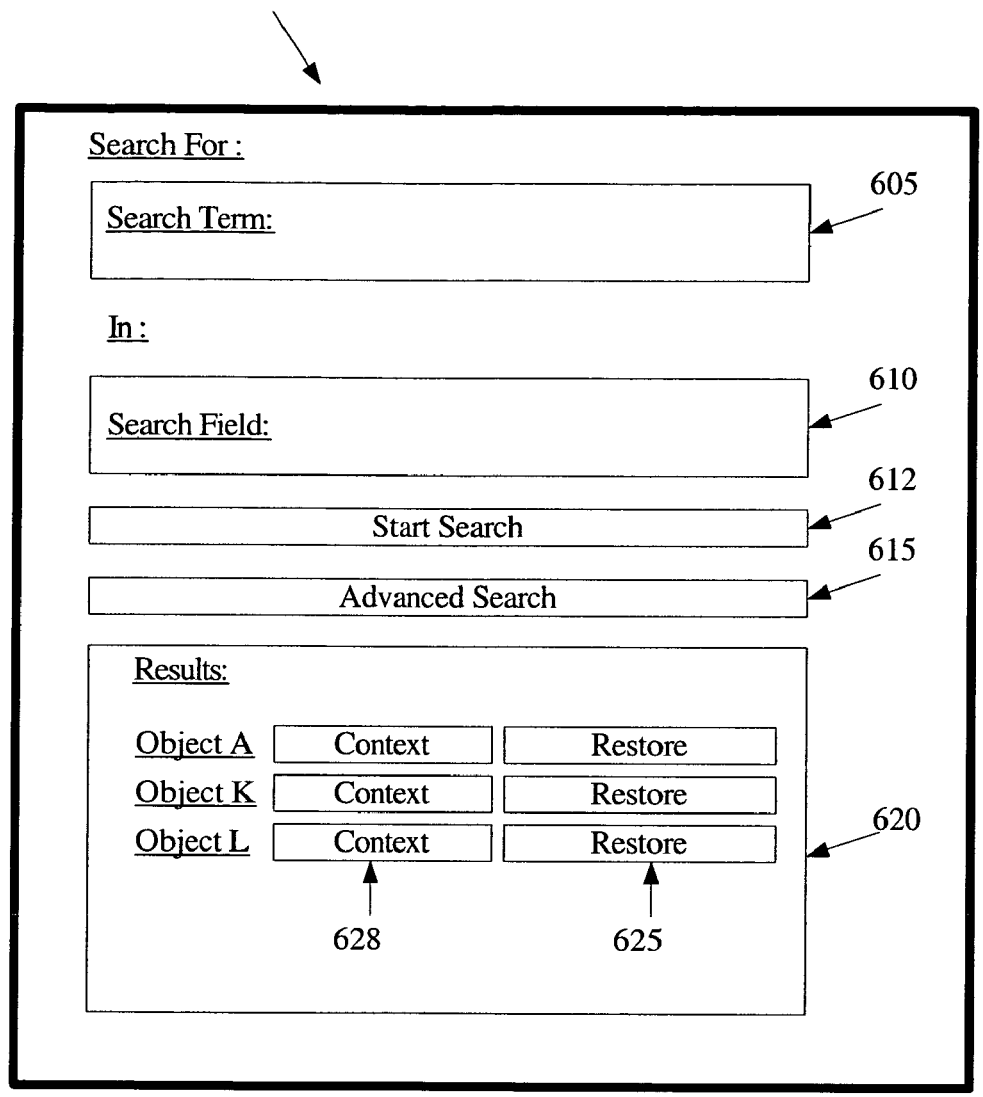
FIG. 6 is a block diagram illustrating an exemplary graphical restoration selection interface that may be provided by a backup manager, according to one embodiment.

FIG. 6 is a block diagram illustrating an exemplary graphical restoration selection interface 601 that may be provided by backup manager 130, according to one embodiment. As shown, the interface may include regions 605 and 610 to allow a user to specify a search term (e.g., "Olympics") and a search field (e.g., "Keyword", "Text", etc.), respectively. A Start Search button 612 may be used to initiate the search. In the illustrated embodiment, the interface may also allow a user to request an advanced search (using button 615), which may, for example allow Boolean combinations of search terms and search fields to be specified. Search results may be displayed in results area 620. In the illustrated example, the results include backup versions of storage objects A, K and L, indicating that the backup versions A, K and L match the search criteria specified by the user and also that the user is authorized to access and/or restore A, K and L. The context in which the search terms specified by the user are found within the storage objects may be illustrated in context boxes 628 in some embodiments, e.g., if the word "Olympics" was specified as a search term, the sentences or paragraphs within the objects A, K and L in which the word "Olympics" appeared may be shown in a corresponding context box 628 for each storage object. The user may use restore buttons 625 may be used by the user to initiate restoration of the corresponding backup versions. In some implementations, activation or clicking on the restore buttons may lead to additional interface elements such as dialog boxes being activated, where details such as restoration targets may be specified (e.g., the user may be asked whether the objects are to be restored in place or at another location). Web-based interfaces may be used for restoration selection in some embodiments, while proprietary graphical or command-line interfaces may be used in other embodiments. Additional buttons and/or fields, not shown in FIG. 6, as well as other features may also be included in restoration selection 601 in some embodiments. Using an interface similar to that shown in FIG. 6, searches over very large data sets distributed across various types of storage media and/or storage locations may be conducted easily. For example, for regulatory compliance, documents that may be several years old may have to be retrieved from various archival storage devices, along with newer documents that may be stored in more accessible, faster storage; a single request issued using an interface such as that shown in FIG. 6 may be sufficient to initiate the search over all the media and archival stores in an enterprise storage environment.

Figure 7:
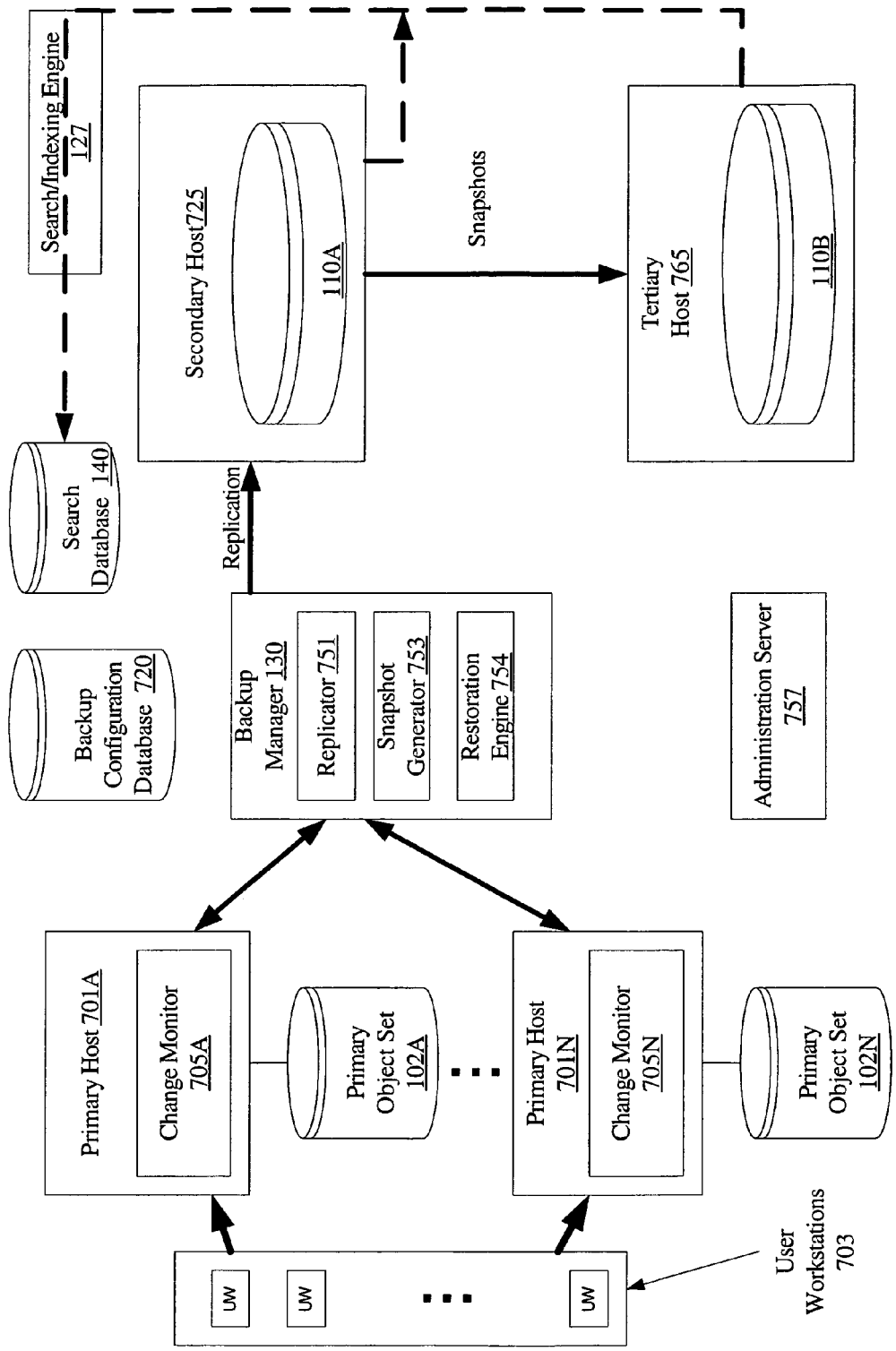
FIG. 7 is a block diagram illustrating an embodiment where updates to primary storage objects at a plurality of primary hosts may be detected as they occur, and where the detected updates may be replicated to a secondary host.

FIG. 7 is a block diagram illustrating an embodiment where updates to primary storage objects at a plurality of primary hosts 701A-701N may be detected as they occur, and where the detected updates may be replicated to a secondary host 725. As shown, primary hosts 701A-701N may each include a respective primary object set 102—e.g., primary host 701A may include primary object set 102A, primary host 701N may include primary object set 102N, etc. The primary object sets 102 may represent data of various applications being executed, for example, on behalf of a plurality of users at user workstations (UW) 703. In one embodiment, for example, one of the applications being supported by one or more primary hosts 701A-701N may be an on-line banking service, or an Internet auction service. As input from the user workstations is received, corresponding data transactions may be initiated, which may result in updates to primary storage objects within object sets 102.

In one embodiment, one or more of the primary hosts 701A-701N may include respective change monitors 705A-705N, such as change monitor 705A at primary host 701A, that may be configured to monitor a specified set of storage objects of a corresponding primary object set 102 for changes. When changes such as object creations, deletions or modifications are detected, the change monitor 705A-705N may be configured to inform the backup manager 130 (e.g., via a journaling mechanism), and a replicator 751 within the backup manager may be configured to replicate the changes at the secondary host 725. In some implementations, replicator 751 may be configurable to perform replication operations in either direction, as desired—e.g., from primary hosts to secondary hosts, or from secondary hosts to primary hosts. In one specific embodiment, a change monitor 705A-705N may be configured to detect a variety of I/O operations (e.g., operations to read; write, or modify attributes such as security or ownership attributes of files) performed on the set of primary storage objects, and to notify the backup manager 130 of the I/O operation detected. Replicator 751 may be configured to then replicate the I/O operation at one or more backup version sets 110A at the secondary host 725. In this way, changes being made at primary hosts 701A-701N may be very quickly reflected at the secondary host 725—e.g., the state of the backed up versions of primary storage objects at secondary host 725 may track the state of the primary object sets 102 to within a few milliseconds in some implementations. Such a replication process, in which changes being made to the primary storage objects are detected and replicated in real time may be termed "continuous replication" or "real-time replication", and the backup manager 130 may be termed a "continuous protection server" in embodiments supporting continuous replication.

It is noted that in some embodiments, periodic replication rather than continuous replication may be employed; for example, changes made to primary storage objects may be accumulated and replicated in batches, e.g., once every five minutes. Change monitors 705A-705N may be implemented via file system filter drivers in some embodiments, which may be configured to intercept I/O operations as they are executed at the primary hosts 701A-701N. In one embodiment, change monitors 705A-705N may be configured to periodically check for changes to storage objects, instead of continuously monitoring for changes. In another embodiment, the replication process may include a synchronization of a primary object set 102 (e.g., a file system) with a replica 110A at secondary host 725, with the additional capability of monitoring and replicating changes that occur at the source data set after the synchronization begins—that is, both synchronization and continuous replication may be performed by backup manager 130. In some embodiments, backup and restoration operations may be managed in transactional units called jobs.

In addition to supporting continuous and/or periodic replication as described above, in some embodiments backup manager 130 may also include a snapshot generator 753, configured to create snapshots or point-in-time versions of desired subsets of the replicated data. For example, in one embodiment, snapshot generator 753 may be configured to create new images of specified sets of primary storage objects from backup version set 110A once every hour (or at any specified frequency), and to store the images within backup version set 110B at tertiary host 765. Thus, secondary host 725 may serve as a staging area for backed up data between the primary hosts 701A-701N and tertiary hosts 765. Database entries 160 in search database 140 may be generated by search/indexing engine 127 as described above. As noted earlier, backup manager 130 may be configured to perform the functions of database entry creation and index generation in some embodiments, instead of relying on an external search engine. In one embodiment, multiple search databases 140 may be employed, e.g., one search database 140 corresponding to each backup version set 110A-110N. Search results from the one or more search databases may have to collected, collated and presented to the user in specified result-set size units in some embodiments (e.g., in one implementation, no more than twenty results may be shown on a single page of a web-based restoration selection interface 601). In one implementation, the specific set of search databases that are searched in response to a user's search request may be configurable: e.g., for a first user, a first set of databases may be searched, and for a second user, a second set of databases may be searched. Such differential search capabilities may be used, for example, in embodiments where search and restore operations are billable, and the billing rates for users may vary with the set of backup versions that the users are allowed to access. In some embodiments, tape devices or optical storage devices such as various types of jukeboxes may be used for tertiary storage, while in other embodiments, the tertiary storage devices may include disks, disk arrays and the like. Snapshot functionality provided by an operating system in use at the secondary host 725 may be used by backup manager 130, instead of or in addition to snapshot generator 753, in some embodiments.

Backup manager 130 may include a restoration engine 754 in some embodiments, which may be configured to implement restoration operations from secondary host 725 or from tertiary host 765. In such an embodiment, restoration engine 754 may provide the restoration selection interface 601 described above. Configuration information for backup operations, for example including locations of various versions of backed up objects, may be stored in backup configuration database 720 in one embodiment. In another embodiment, an administration server 757 may provide an interface such as an administrative console to configure and manage backup server 130 and its components, such as replicator 751 and snapshot generator 753, as well as search/indexing engine 127. In one embodiment, in addition to backing up primary hosts 701, backup manager 130 may also be configured to back up data of one or more user workstations 703. In some implementations, any combination of replicator 751, snapshot generator 753 and restoration engine 754 may be implemented as independent modules or programs that may be invoked by backup manager 130 as needed. The processes of replication and snapshot generation may be performed independently of each other, or asynchronously with respect to each other, in some embodiments. Snapshots may be generated using any of a variety of specific techniques by snapshot generator 753, e.g., using operating system-provided snapshot functionality, volume mirroring, space efficient snapshot techniques, or custom hardware snapshot techniques.

Figure 8:
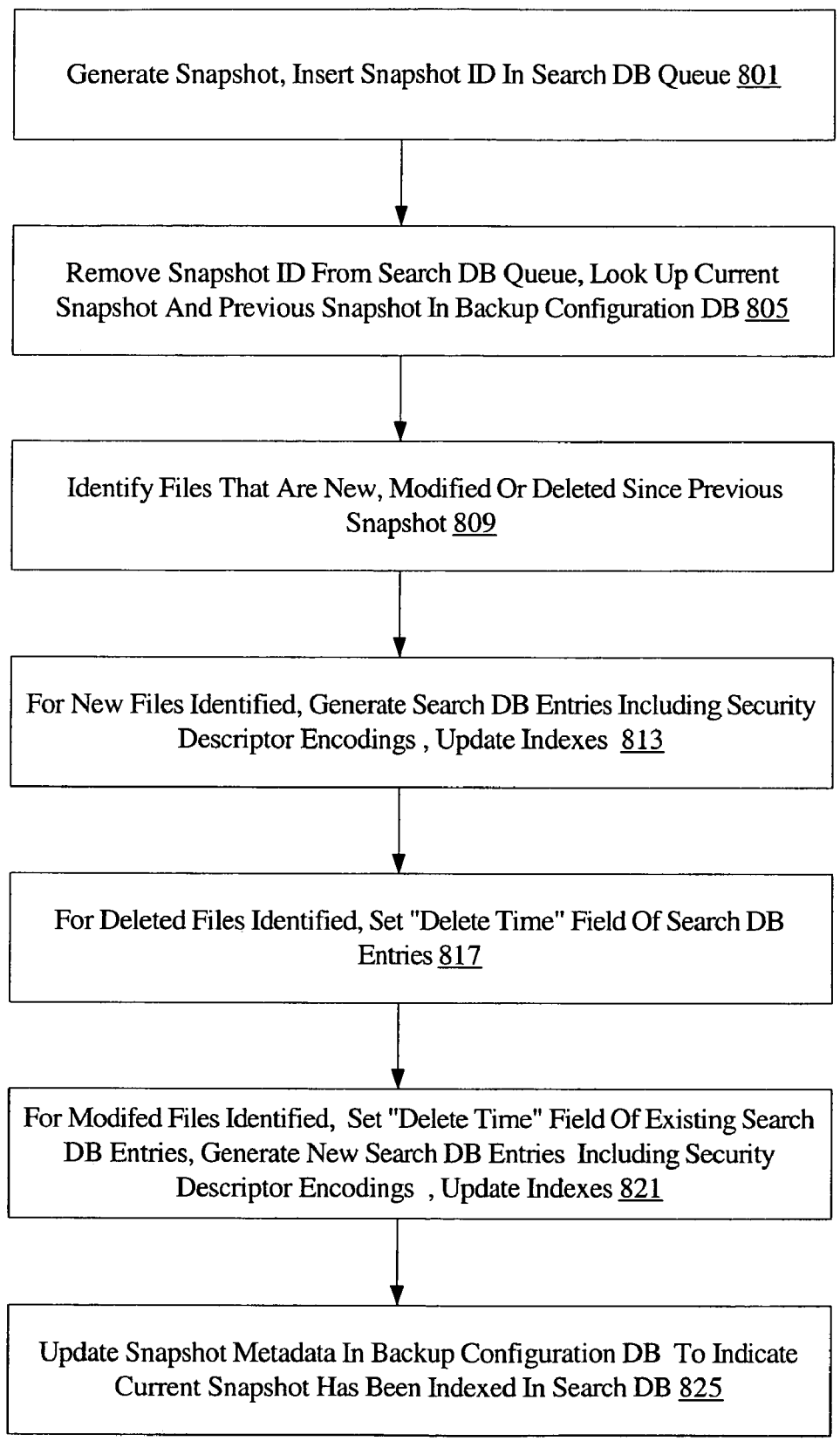
FIG. 8 is a flow diagram illustrating aspects of the operation of a backup manager in an embodiment where primary storage objects include files in one or more file systems, and where one or more backup version sets are generated as volume-level snapshots.

FIG. 8 is a flow diagram illustrating aspects of the operation of backup manager 130 in an embodiment where primary storage objects 105A, 105B, and 105N include files in one or more file systems, and where one or more backup version sets (such as backup version set 110B in FIG. 7) are generated as volume-level snapshots. In the depicted embodiment, each snapshot may have a unique identifier or snapshot ID associated with it, and configuration information or metadata attributes about the snapshot (e.g., the current state of a snapshot, an identifier of the volume for which the snapshot is created, whether search database entries 160 have been created for the snapshot, snapshot location, size, etc.) may be stored within a backup configuration database 720. Upon generating a snapshot, the snapshot ID for the newly created snapshot may be placed in a search database queue, indicating that search database entries 160 are to be generated for the newly created snapshot (block 801 of FIG. 8). One or more execution threads of the backup manager 130 may be responsible for removing snapshot IDs from the queue and generating the corresponding entries 160. When such a thread removes the snapshot ID from the queue, the thread may also be configured to retrieve one or more attributes of the current snapshot and the previous snapshot for the same volume from the backup configuration database (block 805) (if such a previous snapshot exists). Using a location attribute indicating where the current and previous snapshots are stored, the backup manager 130 may be configured to identify files that have been created, deleted or modified since the previous snapshot was generated (block 809). For example, for files that exist in the current snapshot and in the previous snapshot, the backup manager 130 may look at file attributes such as modification time to identify the modified files. To identify new and deleted files, the backup manager 130 may compare contents of directories included in the current and previous snapshots.

For new files that did not exist in the previous snapshot, the backup manager 130 or the search/indexing engine 127 may be configured to generate a database entry 160 including a security descriptor encoding 174, and update indexes 161A-161P as described earlier (block 813). In some embodiments, e.g., in order to ensure that file deletion history is maintained in the search database, database entries 160 for a particular file 105A, 105B, or 105N may not be removed from the search database 140 even if the primary version of the file 105A, 105B, or 105N is deleted. In one such embodiment, database entries for a file 105A, 105B, or 105N may be retained as long as at least one snapshot that includes a version of the file remains within the system. For files that were deleted since the last snapshot, in such embodiments delete time fields 186 may be set to the time at which the new snapshot was created (i.e., the time at which the first snapshot was created after the file was deleted) (block 817). In other embodiments, database entries 160 for a deleted file may be deleted at the time the next snapshot is created. File modifications may be treated as a combination of a deletion of an old version and a creation of a new version. The operations performed for files that were modified since the last snapshot may therefore be a combination of the operations performed for deletes and creates— e.g., the delete time field may be set in an existing database entry, and a new entry may be created as described above (block 821). After the contents of the new and previous snapshots have been examined, metadata for the new snapshot may be updated to indicate that the snapshot has been indexed or entered in the search database 140 (block 825).

Figure 9:
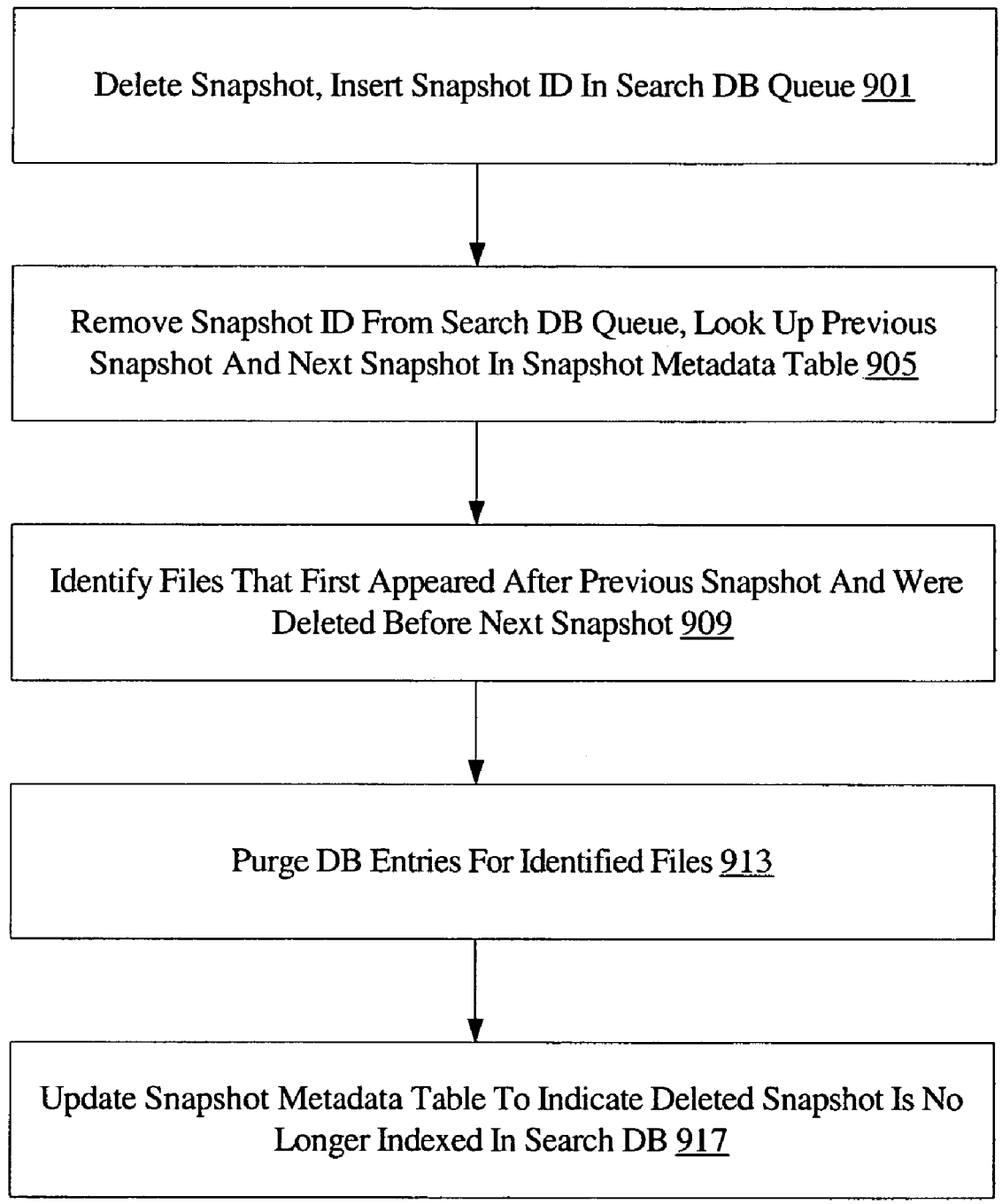
FIG. 9 is a flow diagram illustrating aspects of the operation of a backup manager in response to a deletion of a backup version set implemented as a snapshot, according to one embodiment.

FIG. 9 is a flow diagram illustrating aspects of the operation of backup manager 130 in response to a deletion of a backup version set 110A-110N implemented as a snapshot, according to one embodiment. As shown, when the snapshot is deleted, the snapshot ID may be placed in a search database queue (block 901 of FIG. 9), indicating that the database entries corresponding to the snapshot may be examined for possible removal from the search database 140. Snapshots may be deleted automatically in some embodiments, e.g., based on a snapshot retention policy implemented by a backup manager 130 or an operating system. For example, in some such embodiments, snapshots may be retained only up to a specified number of days or weeks, or may be selected for deletion when the storage allocated to snapshots exceeds a threshold. In other embodiments, snapshots may be deleted on explicit requests, e.g., from a backup administrator. In some implementations, the same search database queue whose use was described above in the context of snapshot generation may also be used when snapshots are deleted. A thread of the backup manager 130 may be configured to remove the snapshot ID from the queue, and to retrieve attributes of the deleted snapshot, the immediately previous snapshot for the same volume (if such a snapshot exists), and the immediately next snapshot for the same volume (if such a snapshot exists) (block 905). The backup manager 130 may be further configured to identify files that first appeared after the previous snapshot, and that do not appear in the next snapshot (block 909), i.e., the files that only appeared in the deleted snapshot. Search database entries 160 for the identified files may then be deleted or purged from the search database 140 (block 913), and metadata for the deleted snapshot may be updated to indicate that the deleted snapshot is no longer indexed in the search database (block 917).

In some embodiments, backup manager 130 may be configured to support a snapshot reconcile operation, during which the snapshot metadata stored in the backup configuration database 720 may be examined to identify snapshots that may need to be indexed or un-indexed. If the metadata for a snapshot indicates that it is not yet deleted and is not indexed, it may be a candidate for indexing (e.g., for the operations illustrated in FIG. 8), and if the metadata indicates that the snapshot has been deleted but is still indexed, it may be a candidate for un-indexing (e.g., for the operations illustrated in FIG. 9).

Figure 10:
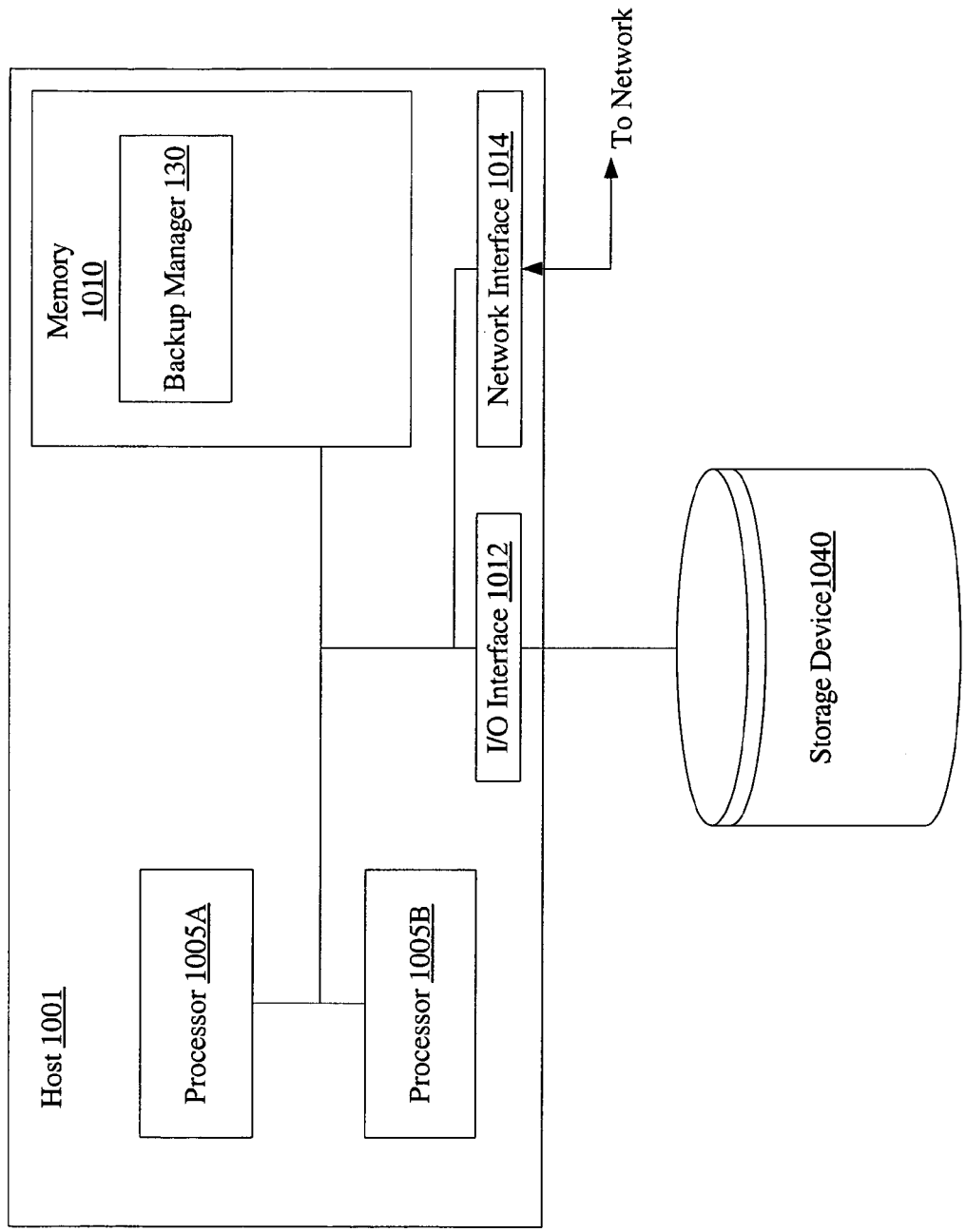
FIG. 10 is a block diagram illustrating constituent elements of a computer host, according to one embodiment.

In various embodiments, at least a portion of backup manager 130 may be executed at primary, secondary or tertiary hosts. FIG. 10 is a block diagram of a computer host 1001 that may be deployed as needed as a primary host 701, a secondary host 725, or a tertiary host 765, according to one embodiment. As shown, host 1001 may include one or more processors 1005A and 1005B. In various embodiments, processors 1005A and 1005B may be implemented using any desired architecture or chip set, such as the SPARC™ architecture from SUN MICROSYSTEMS™ or the x86-compatible architectures from INTEL CORPORATION™, ADVANCED MICRO DEVICES™, etc. Program instructions that may be executable to implement part or all of the functionality of backup manager 130 and/or search/indexing engine 127 may be partly or fully resident within a memory 1010 at a given point in time, and may also be stored on a storage device 1040. Memory 1010 may be implemented using any appropriate medium such as any of various types of RAM (e.g., DRAM, SDRAM, RDRAM, SRAM, etc.). In addition to processors 1005 and memory 1010, host 1001 may also include one or more I/O interfaces 1012 providing access to storage devices 1040, one or more network interfaces 1014 providing access to a network, interfaces to display devices (not shown), and the like. Any of a variety of storage devices 1040 may be used to store the instructions as well as data for backup manager 130 and/or the contents of backup version sets 110 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 1040 may be directly coupled to host 1001 in some embodiments (e.g., using the Small Computer Systems Interface (SCSI) protocol), or may be accessible over any desired storage interconnect such as a fiber channel fabric or storage area network (SAN) in other embodiments.

In addition to backup manager 130, memory 1010 and/or storage devices 1040 may also store operating systems software and/or software for various applications such as backup configuration database 720, administration server 757, etc. in various embodiments. In some embodiments, backup manager 130 may be included within an operating system, a storage management software product or another software package, while in other embodiments, backup manager 130 may be packaged as a standalone product. In one embodiment, restoration functions described above may be provided by a separate tool, e.g., a restoration manager, rather than by a backup manager 130. In some embodiments, part or all of the functionality of backup manager 130 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    storing one or more backup versions of a plurality of storage objects in one or more storage devices;
    initiating a generation of a plurality of database entries, wherein each database entry corresponds to a backup version of a storage object of the plurality of storage objects, wherein each database entry includes an indication of a location of the corresponding backup version within the one or more storage devices, wherein each database entry includes an encoding of a security descriptor associated with the storage object, wherein the encoding of the security descriptor associated with the storage object is generated by applying a lossy compression technique to the security descriptor;
    receiving a backup version search request from a user, wherein the backup version search request comprises one or more user-specified search terms;
    identifying a compatible set of security descriptors, wherein the compatible set of security descriptors comprises one or more security descriptors that are compatible with authorization privileges of the user;
    generating an encoding of each of the compatible set of security descriptors by applying the lossy compression technique;
    performing a search of the plurality of database entries based on search criteria, wherein the search criteria comprise the one or more user-specified search terms and the encodings of the compatible set of security descriptors, wherein results of the search exclude database entries that do not include an encoding of at least one of the compatible set of security descriptors; and
    identifying, based on the search, one or more backup versions of a particular storage object that the user is authorized to access.

2. The method as recited in claim 1, wherein a database entry corresponding to a backup version of the particular storage object includes a field indicative of contents of the backup version of the particular storage object, and wherein the backup version search request includes a content-based search criterion.

3. The method as recited in claim 1, further comprising:
in response to a restoration request from a user, restoring the particular storage object from a backup version of the one or more backup versions of the particular storage object that the user is authorized to access.

4. The method as recited in claim 1, wherein a backup version of the one or more backup versions of the particular storage object is included within a replica of the plurality of storage objects.

5. The method as recited in claim 1, wherein a backup version of the one or more backup versions of the particular storage object includes a point-in-time copy of the particular storage object.

6. The method as recited in claim 5, wherein the point-in-time copy is included within a snapshot of a replica of the plurality of storage objects.

7. A system, comprising:
a processor;
one or more storage devices; and
a memory coupled to the processor,
wherein the memory stores program instructions computer-executable by the processor to implement a backup manager configured to:
store one or more backup versions of a plurality of storage objects in the one or more storage devices;
initiate a generation of a plurality of database entries, wherein each database entry corresponds to a backup version of a storage object of the plurality of storage objects, wherein each database entry includes an indication of a location of the corresponding backup version within the one or more storage devices, wherein each database entry includes an encoding of a security descriptor associated with the storage object, wherein the encoding of the security descriptor associated with the storage object is generated by applying a lossy compression technique to the security descriptor;
receive a backup version search request from a user, wherein the backup version search request comprises one or more user-specified search terms;
identify a compatible set of security descriptors, wherein the compatible set of security descriptors comprises one or more security descriptors that are compatible with authorization privileges of the user;
generate an encoding of each of the compatible set of security descriptors by applying the lossy compression technique;
perform a search of the plurality of database entries based on search criteria, wherein the search criteria comprise the one or more user-specified search terms and the encodings of the compatible set of security descriptors, wherein results of the search exclude database entries that do not include an encoding of at least one of the compatible set of security descriptors; and
identify, based on the search, one or more backup versions of a particular storage object that the user is authorized to access.

8. The system as recited in claim 7, wherein a backup version of the one or more backup versions of the particular storage object is included within a replica of the plurality of storage objects.

9. The system as recited in claim 7, wherein a backup version of the one or more backup versions of the particular storage object is included within a snapshot of a replica of the plurality of storage objects.

10. The system as recited in claim 7, wherein the backup manager is further configured to generate the plurality of database entries.

11. A storage medium comprising program instructions, wherein the instructions are computer-executable to:
store one or more backup versions of a plurality of storage objects in one or more storage devices;
initiate a generation of a plurality of database entries, wherein each database entry corresponds to a backup version of a storage object of the plurality of storage objects, wherein each database entry includes an indication of a location of the corresponding backup version within the one or more storage devices, wherein each database entry includes an encoding of a security descriptor associated with the storage object, wherein the encoding of the security descriptor associated with the storage object is generated by applying a lossy compression technique to the security descriptor;
receive a backup version search request from a user, wherein the backup version search request comprises one or more user-specified search terms;
identify a compatible set of security descriptors, wherein the compatible set of security descriptors comprises one or more security descriptors that are compatible with authorization privileges of the user;
generate an encoding of each of the compatible set of security descriptors by applying the lossy compression technique;
perform a search of the plurality of database entries based on search criteria, wherein the search criteria comprise the one or more user-specified search terms and the encodings of the compatible set of security descriptors, wherein results of the search exclude database entries that do not include an encoding of at least one of the compatible set of security descriptors; and
identify, based on the search, one or more backup versions of a particular storage object that the user is authorized to access.

12. The storage medium as recited in claim 11, wherein a backup version of the one or more backup versions of the particular storage object is included within a replica of the plurality of storage objects.

13. The storage medium as recited in claim 11, wherein a backup version of the one or more backup versions of the particular storage object is included within a snapshot of a replica of the plurality of storage objects.

* * * * *